April 30, 1940.                H. LOEVENSTEIN                2,198,673
PROCESS FOR THE MANUFACTURE OF ALUMINUM
Filed Nov. 14, 1938
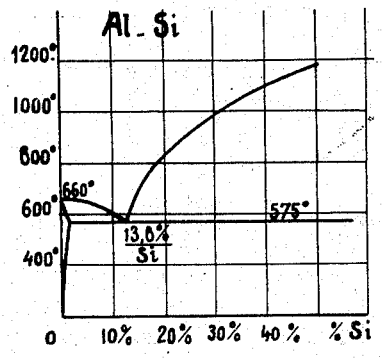
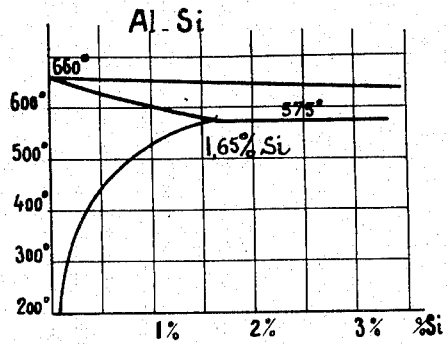
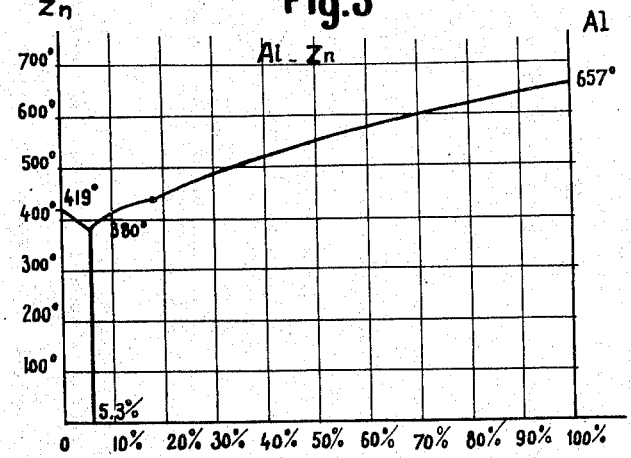
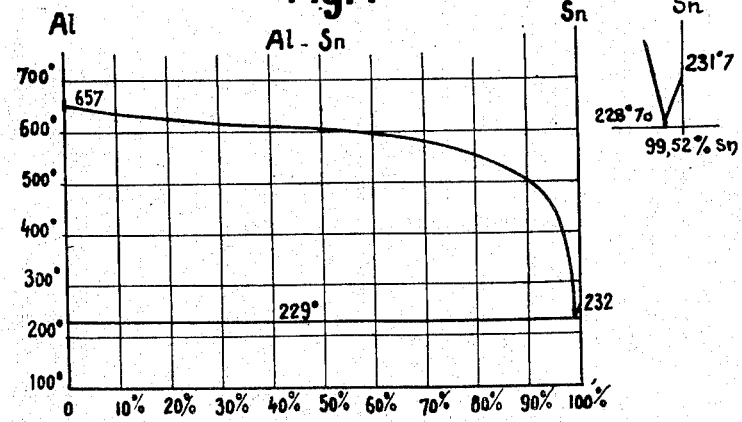
INVENTOR
Hirsch Loewenstein
BY
ATTORNEY.

Patented Apr. 30, 1940

2,198,673

UNITED STATES PATENT OFFICE 2,198,673

PROCESS FOR THE MANUFACTURE OF ALUMINUM

Hirsch Loevenstein, Paris, France, assignor of one-half to Israel Jacob Foundaminsky, Paris, France Application November 14, 1938, Serial No. 240,331 In France July 11, 1938

10 Claims. (Cl. 75—63)

The process at present in use for the manufacture of aluminum consists, on one hand, in the preparation of pure alumina from bauxite, and, on the other hand, in the so called igneous electrolysis of this alumina, i. e. in the electrolysis of the alumina in the molten state at a high temperature, in a bath of molten cryolite. This process has a number of drawbacks. The manufacture of alumina necessitates a special bauxite, poor in silicon, an important quantity of carbon and water and a great amount of labour: the manufacture of aluminum demands substances which are almost chemically pure, a great number of electric furnaces with a comparatively reduced individual capacity, and a great number of highly skilled workers. The manufacture of alumina is conditioned by the cost of the required coal, whilst that of aluminum is conditioned by the cost of the electric current; it is therefore often necessary to arrange the respective factories at a considerable distance from one another. On the other hand, the great amount of water implied in the manufacture of alumina, and the great number of electrolysing units in the manufacture of aluminum require a considerable surface in the lay-out of the plant, a high invested capital and large overhead charges.

A great deal of research work has been carried out with the view of developing a method for the manufacture of aluminum by a thermic process, i. e. by a direct reduction of its oxide by carbon in a furnace at the suitable temperature. This research work has not given any interesting results, due to the fact that the aluminum, at the reduction temperature of the alumina, is already fairly volatile. Consequently, the aluminum vapours react with the carbon monoxide and with the carbon itself, thereby forming alumina and aluminum carbide. By this process, there is obtained, therefore, only a small amount of aluminum, the latter being, furthermore, soiled by the carbide.

Various processes have also been proposed for extracting the aluminum from certain of its alloys, as for instance the electrolytic refining of silico-aluminum, or the distillation of ferro-aluminum. All these attempts, however, have shattered either against technical difficulties or against the fact that the aluminum extracted in this manner ran up to an unreasonable price.

The object of the present invention is a process permitting to obtain aluminum from a certain number of its alloys as raw material, without presenting the drawbacks of the processes recalled above.

For facilitating the comprehension of this process, one has represented on the annexed drawing a number of different known curves.

Figure 1 is the curve of the system aluminum-silicon.

Figure 2 represents, at a larger scale, the left part of the curve of Figure 1, in order to show more clearly the solubility of silicon in the solid aluminum.

Figures 3 and 4 are curves showing the points of solidification of zinc and tin according to the proportion of aluminum.

The process consists in subjecting the raw material to the action of an alloy of a metallic treating substance, such as zinc, tin, mercury or various alloys of these metals, capable of forming with the aluminum an alloy which is comparatively rich in aluminum, which remains liquid at a temperature lower than the solidification point of aluminum and which, at said lower temperature, will not, to any considerable extent, i. e. exceeding a few percent, form an alloy with the other constituents of the raw material, the above alloy being further easily separable from the aluminum, then separating the liquid alloy thus formed, from the solid residue at the said lower temperature, and lastly separating the aluminum from the alloyed treating metallic substance.

With this method, there is thus obtained, at a reduced cost, a comparatively very pure aluminum if this is desired, or an aluminum having various degrees of impurity sufficient for most of its uses.

The explanation of this result is the following:

The examination of for instance the curve of the system Al—Si (Figures 1 and 2) shows that there is a eutectic point lying towards the Al side, at 13.8% Si. This means that if an alloy with for instance 40% Si be slowly cooled, there will occur, at about 1100°, a crystallisation of the silicon, while the remaining liquid will become richer in aluminum. At 575° C., the liquid aluminum will only contain about 13% Si in solution. In this liquid are uniformly distributed in suspension the solid silicon crystals, the silicon being no longer dissolved. It is then possible, by the use of suitable means, to separate the solid part and obtain, in this manner, in the liquid state, an Al-Si alloy, which is less rich in silicon than the initial alloy.

By still further lowering the temperature, the whole mass will solidify at 575° while rejecting suddenly, from the dissolved state, a high proportion of silicon. Beyond this temperature, only a small proportion of the silicon is left dissolved in the solid aluminum (1.65% at 575° C., as shown by the curve of Figure 2), the remainder is crystallised in the said solid aluminum. Although the substance is solid, the said dissolved silicon slowly goes over into the crystallised state as the temperature decreases. If it were possible, at a low temperature, to separate from the solid aluminum all the crystallised silicon, this would provide the solution of the problem of obtaining an aluminum with only a low percentage of silicon, i. e. the silicon contained in the form of a solid solution.

The same, or substantially the same considerations may be applied to the systems formed by aluminum with iron, or with titanium.

The problem faced by the inventor consisted therefore in providing a means permitting to obtain aluminum in the liquid state below its melting point. The solution to this problem has been secured by the inventor by treating the above alloys by means of liquid metallic substances, which, in the liquid or vapour state, are capable of dissolving a comparatively large amount of aluminum and a comparatively very small amount of its impurities, thereby forming alloys with a solidification temperature lower than the solidification point of aluminum (660°). This is the case, for instance, for the above mentioned treating substances, as is shown by the curves of Figures 3 and 4, which indicate the solidification points of zinc or tin baths alloyed to variable proportions of aluminum.

The treating substance must further be easily separable from the aluminum which it dissolves, for instance either by distillation (this is the case for zinc, mercury, zinc-cadmium alloys), or by electrolysis (in the case of tin), or further by metallurgical solution (in the case of treatment by tin, the tin being removed by means of molten lead).

The present treatment of the initial materials by a metallic liquid or vaporous treating body is applicable particularly to the aluminum alloys obtained either by reduction, by means of carbon in the electric furnace, or bauxite or another aluminum ore containing, either naturally or through addition, metallic impurities capable of alloying with the aluminum, or by reduction of alumina in the presence of an alloy metal or its ore, the boiling point of which is higher than that of aluminum, such as iron, silicon, titanium or their mixtures; the process is also particularly applicable to the treatment of aluminum or aluminum alloy scraps or of the sludges from the baths of molten aluminum.

Before being subjected to the treating substance mentioned above, the alloys such as Al-Fe and Al-Si may be enriched with aluminum by heating for melting and collecting the eutectic components which are richer in Al, without melting the rest of the mass.

By the choice of zinc as a treating metal (melting point 419°), or of tin (melting point 232°), there are obtained aluminum alloys, the solidification point of which (cf. curves of Figures 3 and 4), variable according to the proportion of aluminum, may descend down to 380° in the case of zinc, and down to 228° in the case of tin, i. e. the separation of the liquid part of the bath may be effected at a temperature well below the melting point of aluminum (660°) and consequently there will be obtained, at such temperatures, dissolved in the aluminum of said bath, only very small proportions of silicon and iron.

If, for instance, zinc is taken as the extraction metal, it will be interesting to work in the close vicinity of the melting point, 420° (cf. curve of Figure 3) and even descend down to 380° C. (eutectic point of Zn-Al). At this temperature, the aluminum only dissolves about 0.25% silicon (cf. Figure 2) and practically no iron at all. The extraction may therefore be commenced at 420° C. and ended at 380° C. One therefore descends on the melting curve of the system Zn-Al, on the side of Zn, down to the eutectic point. By adding cadmium to the zinc, the melting temperature is correspondingly lowered (an alloy Zn-Cd with 20% Cd melts below 380° C.); in this way, of course, the dissolving power of the bath for aluminum is decreased, since cadmium does not dissolve aluminum, but at the same time the amount of Fe and Si which dissolve in aluminum are advantageously reduced.

By adding cadmium, therefore (cf. Example 2 below), the extracted aluminum is obtained in a more pure state, but its cost price increases correspondingly, since its percentage in the extracting metal decreases. The lower, therefore, the extraction temperature, the purer the obtained aluminum.

In the case tin be chosen for the metal of the extracting liquid bath, the following should be remarked. The eutectic point Sn-Al (cf. curve of Figure 4, the right part of which has been further represented at an enlarged scale) lies in close vicinity of the Sn line. But at this temperature (229° C.), the tin dissolves only 0.5 aluminum. The melting curve of the system rises here very rapidly, and at 400° C., only 3.5% Al are dissolved in the tin. By using tin, it will be more economical to use a higher extraction temperature. The extracted aluminum will be less pure, but since the elimination of tin will be effected electrolytically, giving a deposit of pure aluminum, the higher percentage of impurities in the extracted aluminum is in this case less important.

The inventor has found that the amounts of impurities dissolved in the aluminum when the latter is itself dissolved in the treating bath at a temperature $T_2$ lower than the solidification point of aluminum are precisely those existing in "solid solution" in the solid aluminum at the said temperature $T_2$. This means that matters may be regarded as if the treating bath dissolves, in the raw material, the solid mass of aluminum solely with those parts of impurities which are dissolved in the aluminum in a state of solid solution, plus the impurities soluble in the treating bath itself, leaving aside the part of impurities which is free in the crystallised state in the solid mass of aluminum and in the rest of the raw material. The result is that if, after the solution of the solid aluminum alloy of the raw material in the treating bath, the temperature of this liquid mass is varied, for instance by lowering it from $T_1$ to $T_2$, there will be deposited a quantity of impurities corresponding to the decrease, between said two temperatures, on one hand of the coefficient of solid solution of the impurities in the aluminum, and, on the other hand of the coefficient of solubility of the impurities in the metal of the bath. The liquid, brought down to the lowest temperature $T_2$, will therefore have, in its liquid part, the same composition as if the extraction of the aluminum from the raw material by the treatment bath had been effected directly at this temperature $T_2$.

The temperature of the liquid may therefore be brought, after extraction at the temperature $T_1$, to the lowest temperature $T_2$ corresponding to a lower proportion of dissolved impurities, and one may then separate from the liquid the part of impurities which is rejected in the solid state in the midst of the liquid mass.

The benefit of the present invention may also be obtained by performing the extraction at any suitable temperature, even superior to the melting point of the aluminum, if the temperature of the bath is thereafter decreased.

These various operating methods are of great importance. They enable the use of a liquid metal bath at a fairly high temperature, or even the vapours of such a bath, or both in succession. In order to carry out the present alloying treatment of the initial charge e. g. of impure aluminum with a vaporous extracting metallic body the vapours of the latter are passed either through or over the solid initial product after the same has been broken up into comparatively small lumps. The vapours enter into contact with the impure aluminum of the initial material and an alloy is formed which is liquid even at a temperature which is much higher than the evaporation point of the extracting metal because the aluminum entering into the alloy with said metal greatly diminishes its vapour pressure. This alloy is separated in the liquid state; as it is formed at a comparatively high temperature the treating metal extracts from the initial material a relatively great amount of aluminum; it is true that on account of this elevated temperature the dissolution rate of the impurities in the extracted aluminum may also be relatively high; however, this is irrelevant because according to the essential principle of this invention it just suffices to lower the temperature of the liquid alloy bath so that an essential portion of the dissolved impurities of which the solubility figure decreases with the temperature is precipitated and can be separated from the liquid bath. The treatment will be effected preferably by the counter-current method, i. e. the suitably broken up raw material and the treating liquid or vapour will be caused to travel in opposite directions respectively. There will thus be obtained an almost complete extraction of the aluminum from its alloys, and this in a short time if the operation is carried out at a high temperature, because the rapidity of the solution increases with the temperature. These various operating methods also permit to increase the aluminum percentage in the extraction bath and thus decrease its price. The curves of the solidification points of the alloys of the zinc or tin baths with aluminum in terms of the aluminum percentage (cf. curves 3 and 4) show that this solidification point rises with the proportion of aluminum. The result is that if the bath contains a greater proportion of aluminum, the temperature within which the bath remains liquid may be decreased less and consequently the aluminum will be obtained with a higher proportion of impurities; but, for certain applications, this higher proportion of impurities may be accepted or even desired These improvements further permit to vary, within large limits, the extraction conditions, and thus substantially facilitate the technical and economical realisation of the process.

The liquid may be brought from the extraction temperature $T_1$ to the desired temperature $T_2$ by suitable cooling and then maintaining it at rest at this temperature $T_2$ until the freed and solidified amounts of impurities are separated from the liquid. Such a decantation, however, requires a considerable length of time.

It will often be advantageous to leave the liquid to solidify and then remelt it at the temperature $T_2$ corresponding to the percentage of aluminum contained; the quantities of impurities at this temperature will then remain in the solid state and will be immediately separable. Even if the melting and the separation are effected rapidly the parts of impurities which may dissolve in the solid or liquid aluminum (it has been seen that the curves of the solubility coefficient were the same in both cases) when passing from the temperature of the solidified mass to the melting temperature, will not have sufficient time to dissolve entirely. By effecting a number of successive meltings and taking advantage at each melting of the time lag in the solution of the impurities, the aluminum will be obtained more and more pure.

In the following examples, corresponding to tests carried out by the inventor, the temperatures indicated are the temperatures at the end of the test.

Example 1

20 g. of a silico-aluminum alloy obtained in the electric furnace and containing about 55% Al, 40% Si and 2.5% Fe were treated at a temperature of about 380° C., with 100 g. of Zn. The liquid part contained 5.37% Al, 0.023% Si and 0.0045% Fe. After eliminating the zinc by distillation, the aluminum obtained in this way contained 0.43% Si and 0.08% Fe.

Example 2

20 g. of an Al-Si alloy (of the same composition and origin as in Example 1) were treated, at a temperature below 380° C., with 100 g. of an alloy containing 80% Zn and 20% Cd. The resulting Zn-Cd-Al alloy contained 4.26% Al, 0.0016% Fe and 0.0043% Si. The aluminum thus extracted therefore contained 0.10% Si and 0.037% Fe.

Example 3

40 g. of an Al-Si alloy (the same as in Example 1) were treated at a dark red temperature, i. e. at about 500°, with 100 g. of Sn. The obtained alloy contained 17.2% Al and 0.8% Si. The extraction of aluminum from this alloy may be obtained either by electrolysis or by treatment with liquid lead.

Example 4

12 g. of a silico-aluminum alloy (same as in Example 1) were treated at a temperature of about 800° C. (very much above the eutectic point, 575°, and even above the melting point of aluminum, 660°) with 100 g. of Zn. The alloy thus obtained contained 1.062% Si, 0.020% Fe and 6 65% Al, corresponding to a percentage composition of 85.99% Al with 13.75% Si and 0 26% Fe.

After cooling down and decantation at a temperature of about 390° C. (very much below the eutectic point Al-Si, 575°) a metal dross containing the major part of the impurities floated on the surface and could thus be easily separated from the rest of the alloy. The alloy now contained 0.039% Si and 0.001% Fe, corresponding to a percentage composition of 99.43% Al and containing impurities to the amount of only 0.56% Si and 0.014% Fe. This result is very close to that of Example 1, where the solution was carried out at 380°.

Example 5

20 g. of an Al-Si-Fe alloy containing about 82% Al, 13% Si and 5% Fe were treated with 100 g. of Zn at a temperature of about 500° C. The alloy obtained with the extraction metal contained 8.28% Al, 0.218% Si and 0.0082% Fe, corresponding to a percentage composition of 97.33% Al, 2.57% Si and 0.095% Fe. After repeated melting (3 times) at a temperature of about 400° C., the alloy did not contain more than 0.0293% Si and 0.0013% Fe, i. e. an aluminum with a percentage composition of 99.63% Al, 0.35% Si and 0.015% Fe.

Example 6

20 g. of a ferro-aluminum with 60% Al, 35% Fe and about 3% Si were treated at about 600° C. with 100 g. of Zn. The obtained alloy contained 4.37% Al, 0.070% Fe and 0.0127% Si, corresponding to a percentage composition of 98.24% Al with 0.29% Si and 1.57% Fe. After remelting and decanting at a temperature of about 390° C., the alloy did not contain more than 0.0055% Si and 0.0092% Fe, corresponding to a percentage composition of 99.70% Al, with only 0.11% Si and 0.19% Fe as impurities.

Example 7

30 g. of an Al-Si-Fe alloy, the same as that of Example 5, were treated with 100 g. Zn at about 850° C. The alloy thus formed contained 2.48% Si, 0.252% Fe and 17.89% Al, corresponding to a percentage composition of 86.64% Al with 12.13% Si and 1.23% Fe. After remelting at about 440° C. and decanting, the Si percentage had gone down to 0.282 and the Fe percentage down to 0.019. The Zn was afterwards eliminated by distillation, and the Al remaining in the furnace had a percentage composition of 98.37% Al, with 1.61% Si and 0.02% Fe as impurities.

More generally, if the extraction is effected at a higher temperature, the aluminum obtained by this process contains higher amounts of iron or silicon, or both together. It is therefore possible, by varying the extraction temperature, to obtain aluminum alloys with a predetermined percentage of Si or Fe.

It is also possible to obtain aluminum alloys with the metals of the treating bath by limiting the elimination of the latter, for instance by stopping the distillation of the zinc or the zinc-cadmium, or by stopping the solution of the tin by means of lead.

If the two above operations are carried out in succession, alloys will be obtained containing at the same time the impurity metals of the raw material and those of the metallic treating substance.

The process further permits to transform the old aluminum or aluminum scraps into a commercially pure aluminum. It is also possible to extract by means of this process comparatively large amounts of aluminum from the sludges formed during the melting and remelting of the latter.

The distillation of the extraction metal may be performed either under usual conditions or under a reduced pressure or under vacuum, with or without the application of a reducing or an inert atmosphere.

The initial alloy remaining after extraction of the aluminum dissolved by the treating bath and which is rich in iron or silicon or both, and poor in aluminum, as well as the solid residue extracted from the treating bath, may be replaced into the electric furnace with the aluminum or with an ore such as bauxite for serving again for the manufacture of aluminum alloys.

What I claim is:

1. Process for the extraction of aluminum in the purified state from substances containing it in high proportions together with at least one impurity of the group consisting of silicon, iron, titanium, comprising an alloying operation of the said substance with at least a metallic extracting body of the group consisting of zinc, tin, mercury and their alloys, and a separating operation, at a temperature below the solidification point of aluminum, of the liquid alloy and the solid bodies.

2. Process according to claim 1, in which the alloying action of the aluminum of the raw material with the metal treating substance is obtained by bringing into contact, in the counter-current manner, the solid and suitably broken up raw material with the metal treating substance.

3. Process according to claim 1, in which the alloying action of the aluminum of the raw material with the metal treating substance is obtained by bringing into contact, in the counter-current manner, the solid and suitably broken raw material with the metal treating substance in the liquid state.

4. Process according to claim 1, in which the alloying action of the aluminum of the raw material with the metal treating substance is obtained by bringing into contact, in the counter-current manner, the solid and suitably broken raw material with the metal treating substance in the vapour state.

5. Process according to claim 1, in which the alloying action of the aluminum of the raw material with the metal treating substance is obtained by methodically bringing into contact, in the counter-current manner, the solid and suitably broken raw material with the metal treating substance first in the liquid state, and afterwards in the vapour state.

6. Process according to claim 1, consisting in extracting the aluminum from the substance containing it, by an alloying action with the metallic extracting body, at a temperature $T_1$, then cooling the liquid alloy to a lower temperature $T_2$, which is below the solidification point of aluminum, then effecting at said lower temperature $T_2$ the separation of the liquid bath and of the impurities released from the dissolved state and solidified by the cooling of the bath from $T_1$ to $T_2$.

7. Process according to claim 1, consisting in effecting the extraction of the aluminum from the substance containing it, by an alloying action with the metallic extracting body, at a temperature $T_1$, then cooling the liquid alloy to a lower temperature $T_2$, which is below the solidification point of aluminum, then effecting by decantation at the said lower temperature $T_2$ the separation of the liquid bath and of the impurities released from the dissolved state and solidified by the cooling of the bath from $T_1$ to $T_2$.

8. Process according to claim 1, consisting in extracting the aluminum from the substance containing it, by an alloying action with the metallic extracting body, at a temperature $T_1$, then cooling the liquid alloy down to solidification, then remelting at a temperature $T_2$ lower than the solidification point of aluminum and lower than $T_1$, and separating the alloy which has become liquid from the solid impurities which, at this lower temperature $T_2$, have not gone in solution.

9. Process according to claim 1, consisting in extracting the aluminum from the substance containing it, by an alloying action with the metallic extracting body, at a temperature $T_1$, then cooling the liquid alloy down to solidification, then remelting at a temperature $T_2$ lower than the solidification point of aluminum and lower than $T_1$, and separating the alloy which has become liquid from the solid impurities which, at this lower temperature $T_2$ have not gone in solution, said remelting and separating at said lower temperature $T_2$ being effected a number of times in succession fairly rapidly in order that the amounts of impurities soluble at said lower temperature $T_2$ are not given the time at each remelting to dissolve entirely.

10. Process according to claim 1, comprising a reduction operation in the electric furnace of an aluminum ore in the presence of substances containing at least one of the metals of the group consisting of iron, silicon, titanium, an alloying operation of the impure aluminum with at least a metallic extracting body of the group consisting of zinc, tin, mercury and their alloys, a separating operation, at a temperature below the solidification point of aluminum, of the liquid body and the solid bodies, and the separation of the aluminum and the metallic extracting substance.

HIRSCH LOEVENSTEIN.